United States Patent [19]
Ford

[11] Patent Number: 5,915,715
[45] Date of Patent: Jun. 29, 1999

[54] Y-SHAPED TOW BAR HAVING CUSHIONED LEGS

[76] Inventor: Billy C. Ford, 10511 NE 215 Ct., Vancouver, Wash. 98682

[21] Appl. No.: 08/923,513

[22] Filed: Sep. 4, 1997

[51] Int. Cl.[6] .................................................. B60D 1/167
[52] U.S. Cl. ........................... 280/494; 280/482; 280/484; 280/460.1
[58] Field of Search .................................. 280/493, 494, 280/460.1, 482, 486, 487

[56] References Cited

U.S. PATENT DOCUMENTS

| | | | |
|---|---|---|---|
| Re. 35,482 | 3/1997 | Johnson | 280/491.5 |
| 1,259,205 | 3/1918 | Bessesen . | |
| 1,289,141 | 12/1918 | Ferris | 280/491.4 |
| 1,290,813 | 7/1919 | Weaver . | |
| 1,535,397 | 4/1925 | Buffington . | |
| 2,585,768 | 2/1952 | Ham | 280/494 |
| 2,760,789 | 8/1956 | Wampler | 280/494 |
| 2,783,039 | 2/1957 | Wilson | 280/494 |
| 3,492,022 | 1/1970 | Hansen | 280/494 |
| 3,572,765 | 3/1971 | Tieben | 280/491.4 |
| 3,817,558 | 6/1974 | Eger | 280/491 |
| 3,904,226 | 9/1975 | Smalley | 280/486 |
| 3,947,062 | 3/1976 | Pierce | 280/491.4 |
| 4,281,847 | 8/1981 | Robe | 280/446 |
| 4,711,461 | 12/1987 | Fromberg | 280/494 |
| 4,729,576 | 3/1988 | Roach | 280/493 |
| 4,856,805 | 8/1989 | Davis | 280/491.4 |
| 4,861,061 | 8/1989 | Frantz | 280/479.2 |
| 4,978,133 | 12/1990 | Thorne et al. | 280/484 |
| 5,071,153 | 12/1991 | Duncan | 280/491.4 |
| 5,112,074 | 5/1992 | Smith | 280/483 |
| 5,224,960 | 7/1993 | Duncan | 280/491.4 |
| 5,306,037 | 4/1994 | Robertson | 280/495 |
| 5,380,030 | 1/1995 | Gullickson | 280/486 |
| 5,429,382 | 7/1995 | Duncan | 280/491.4 |
| 5,516,140 | 5/1996 | Hinte | 280/494 |
| 5,762,374 | 6/1998 | Grove et al. | 280/847 |
| 5,765,851 | 6/1998 | Parent | 280/491.4 |

*Primary Examiner*—Lanna Mai
*Assistant Examiner*—Andrew J. Fischer
*Attorney, Agent, or Firm*—Chernoff, Vilhauer, McClung & Stenzel, LLP

[57] ABSTRACT

A Y-shaped tow bar includes extensible legs which are rotatably mounted to the trunk of the tow bar. Each leg may be locked into a nominally extended position wherein further extension and compression is resistingly and constrainedly permitted by a pair of shock absorbing springs.

2 Claims, 2 Drawing Sheets

Y-SHAPED TOW BAR HAVING CUSHIONED LEGS

BACKGROUND OF THE INVENTION

The present invention is a Y-shaped towing hitch having extensible legs that resistingly and constrainedly permit further extension and compression from a nominally extended position, thereby cushioning shocks between a towing and a towed vehicle.

The present invention finds its most common application in the form of a hitch specifically adapted to enable a towing vehicle such as a motor home to pull a towed vehicle such as an automobile. Presently available hitches adapted to enable a motor home to pull an automobile are typically Y-shaped, with the trunk of the Y being square in cross section to fit into a receptive attachment port found at the rear of most motor homes.

The legs of the Y attach to either side of the front of an automobile. When installed between a motor home and a towed vehicle, presently available hitches are typically rigid. This rigidity in the hitch exacerbates the wear of the hitch-to-automobile interfaces, gradually creating excess clearance at the interface points. This permits an unpleasant rattling and accelerates the process of deterioration to the point where the towed automobile could actually become unhitched, creating a spectacular road hazard. Some Y-shaped tow bars having crude cushioning mechanisms have been developed. These tow bars, however, are not extensible thereby being bulkier to transport and suffering from the problem described below.

Another problem faced by motor home-to-automobile tow bars is the need to permit attachment in the situation where the front end of the automobile is not perfectly aligned with the rear end of the motor home. If the motor home is parked in a tight spot, it may be quite difficult to use a presently available tow bar to attach an automobile to the rear of the motor home. Towing bars having extensible legs have been developed to address this problem and to allow easier tow bar storage. But these Y-shaped extensible tow bars are not cushioned.

What is needed but not yet available is a Y-shaped tow bar having legs that are extensible to a nominally extended position that resistingly and constrainedly permits further extension and compression.

SUMMARY OF THE INVENTION

The present invention is a Y-shaped tow bar, comprising a trunk portion adapted for attachment to the rear of a towing vehicle and a pair of extensible leg portions rotatably attached to the trunk portion. The leg portions are adapted for attachment to the front of a towed vehicle. Further, each leg portion is extensible and lockable into a nominally extended position. In its nominally extended position each leg resistingly and constrainedly permits further extension and compression. This further extension and compression is adapted to absorb shocks between the towing and the towed vehicle.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

In this application the end of tow bar 10 that attaches to a towing vehicle will be designated the front or forward end of the tow bar. Likewise the end that attaches to a towed vehicle is designated the rearward end of the tow bar.

Figure 1:
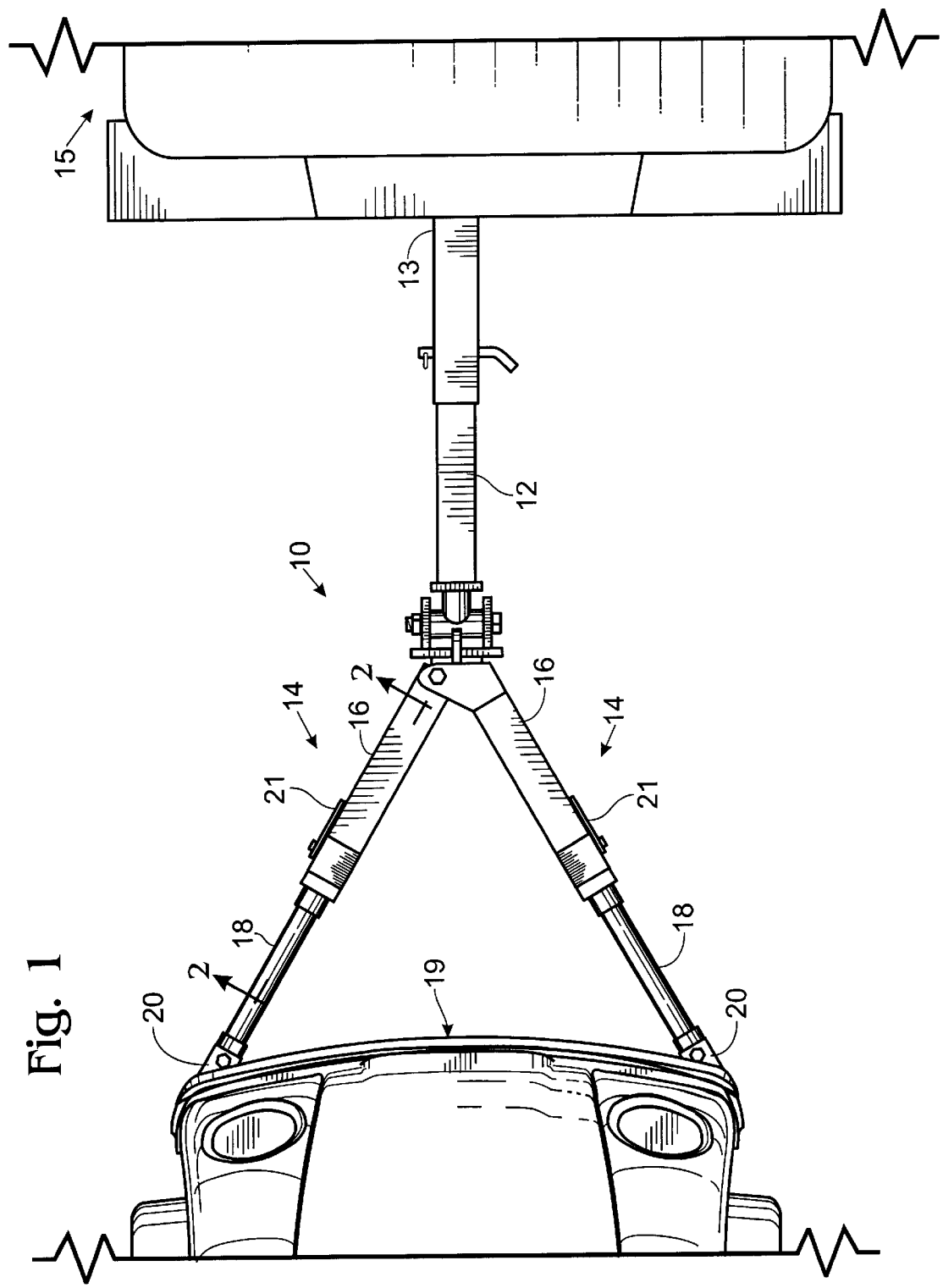
FIG. 1 is a top view of a tow bar according to the present invention.

FIG. 1 is a top view of a tow bar 10 according to the present invention. Tow bar 10 includes a trunk portion 12 that is preferably square in cross section so as to fit into and couple with a standard attachment port 13 in the back of a motor home 15. Alternatively, the trunk 12 may be adapted to fit custom or non-standard attachment parts. A pair of legs 14 are each rotatably attached to trunk 12. Each leg 14 includes an exterior tube 16 and an inner shaft 18 telescopingly engaged with exterior tube 16. Each inner shaft 18 terminates in an attachment bracket 20 that is designed to permit shaft 18 to attach to the side of the front of an automobile 19 at approximately a 45° angle.

Figure 2:
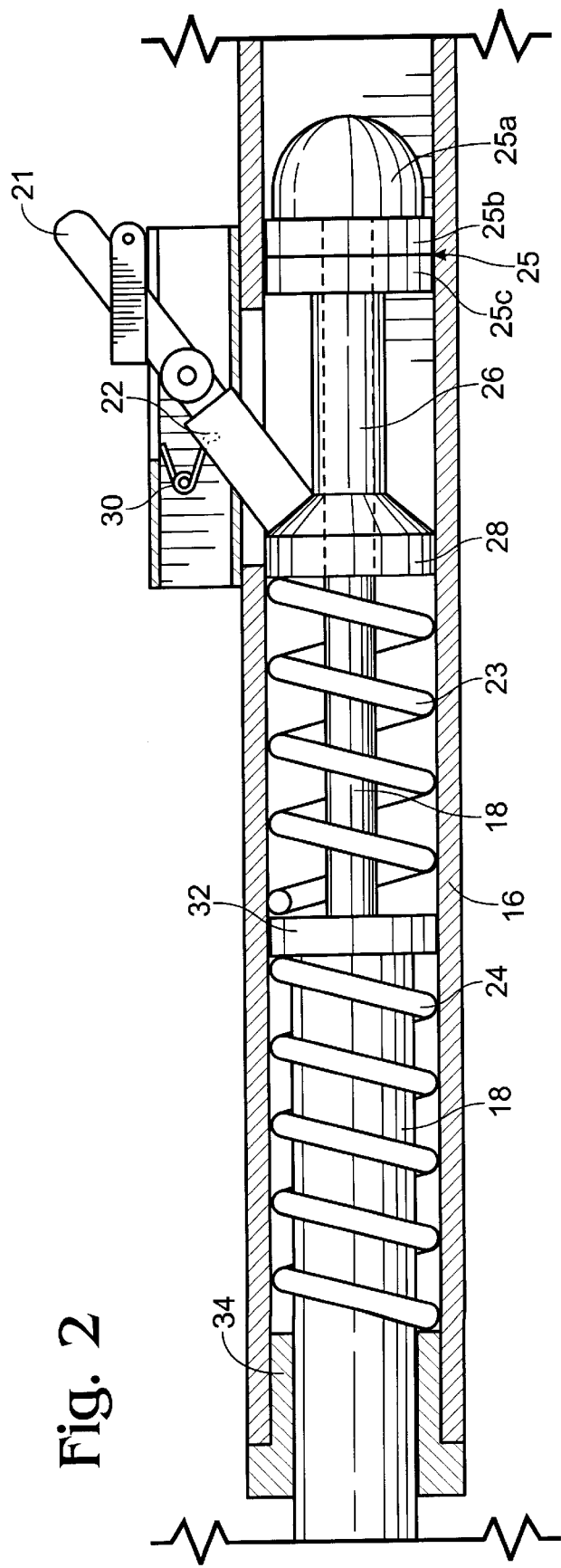
FIG. 2 is a cross-sectional view of a leg of the tow bar of FIG. 1 taken along line 2—2 of FIG. 1.

Each inner shaft 18 may be extended outwardly from its exterior tube 16 until it reaches a nominally extended position. Locking lever 21 allows a user to lock inner shaft 18 into its nominally extended position. In its nominally extended position shaft 18 is held in place by a locking pin 22 (FIG. 2), which is the inner terminus of locking lever 21. As shown in FIG. 2, a front compression spring 23 and a rear compression spring 24 resistingly permit shaft 18 to extend and compress in a range about the nominally extended position. This movement absorbs shocks that occur between the towing and the towed vehicle. This prevents deterioration at the automobile hitch points that could eventually cause the hitch points to rattle and hasten yet further deterioration.

FIG. 2 is a lengthwise cross-sectional view of the interior of leg 14 (henceforth all the elements which are common to both legs 14 will be referred to in the singular) in its nominally extended position. Inner shaft 18 terminates at its front end in a front guide assembly 25, which projects radially outwardly from shaft 18 to slidably contact the inside of tube 16 to constrain the radial movement of shaft 18. Front guide assembly 25 is formed of a crimp locking nut 25a that is crimped to the front end of shaft 18 and two washers 25b and 25c that are retained about shaft 18 by nut 25a.

Slidably fitted about shaft 18 to the rear of (and constrained by) guide assembly 25 is a shaft slider 26. A shaft slider shoulder 28 engages with locking pin 22 (shown in its locked position) to constrain the forward movement of slider 26. Torsion spring 30 engages with locking pin 22 to urge locking pin 22 to remain in its locking position. Locking lever 21 permits a user to release shaft 18 from its nominal extended position by disengaging locking pin 22 from shaft slider shoulder 28.

Front compression spring 23 is held in place between the rear of shaft slider 26 and a rear circular shaft flange 32, which extends radially outwardly from inner shaft 18. From its nominally extended position, inner shaft 18 may move forward until spring 23 is fully compressed.

An exterior tube rear bracket 34 projects radially inwardly from the rear of exterior tube 16. Rear compression spring 24 is held in place between tube rear bracket 34 and rear circular shaft flange 32. From its nominally extended position shaft 18 may move backward until rear compression spring 24 is fully compressed against tube rear bracket 34.

Trunk 12, exterior tube 14, and inner shaft 18, may be made of any sturdy material such as steel. Compression springs 23 and 24 may be coil springs as shown, in which case they could be made of rubber or steel. Alternatively, springs 23 and 24 may be synthetic springs and may be made, for example, from neoprene or any other springable material. A shaft slider 26 may be made, for example, from any sturdy material such as steel.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A cushioned extensible Y-shaped tow bar adapted to be attached to a rearward end of a towing vehicle and a front end of a towed vehicle, said tow bar comprising:
    (a) a trunk portion adapted for attachment to the rear of a towing vehicle; and
    (b) a pair of legs rotatably attached to said trunk portion and adapted for attachment to the front end of a towed vehicle, each leg including:
        (i) an exterior tube having an inwardly directed tube flange and an interior surface;
        (ii) an inner shaft telescoped into said exterior tube and having a front guide assembly engaged with said interior surface of said exterior tube and a rearward outwardly projecting shaft flange;
        (iii) a shaft slider slidingly disposed about said inner shaft behind said front guide assembly, and having a shaft slider shoulder slidingly engaged with said exterior tube;
        (iv) a locking pin being radially inwardly extensible to constrain said movement of said shaft slider shoulder;
        (v) a rear compression spring positioned about said inner shaft between said inwardly directed tube flange and said rearward outwardly projecting shaft flange; and
        (vi) a front compression spring positioned about said inner shaft between said outwardly projecting shaft flange and said shaft slider;
    wherein said inner shaft is lockable into a nominally extended position by pulling said inner shaft outwardly from said exterior tubing and pushing said locking pin radially inwardly to contact said shaft slider shoulder and wherein, when locked in said nominally extended position said inner arm is movable in a manner constrained and resisted by said front compression spring and said rear compression spring.

2. The tow bar of claim 1 wherein said towing vehicle is a motor home having a tow bar attachment port and said trunk portion is adapted to mate with said attachment port.

* * * * *